United States Patent [19]
Ahlberg et al.

[11] Patent Number: 4,665,456
[45] Date of Patent: May 12, 1987

[54] REUSABLE RECORD TAB FOR VIDEOTAPE CASSETTE

[75] Inventors: Carl S. Ahlberg, Minneapolis; Gerald J. Niles, St. Paul, both of Minn.

[73] Assignee: Minnesota Mining and Manufacturing Company, Saint Paul, Minn.

[21] Appl. No.: 728,221

[22] Filed: Apr. 29, 1985

[51] Int. Cl.$^4$ .................. G11B 23/08; G11B 15/04
[52] U.S. Cl. ..................... 360/132; 360/60; 360/137
[58] Field of Search .............. 360/132, 137, 60

[56] References Cited

U.S. PATENT DOCUMENTS 3,721,772  3/1973  Miura et al. .................. 360/132
4,012,011  3/1977  Saito ........................... 242/199
4,380,030  4/1983  Shiba ........................... 360/132

Primary Examiner—Robert S. Tupper
Attorney, Agent, or Firm—Donald M. Sell; James A. Smith; William L. Huebsch

[57] ABSTRACT

Fitted into the record-lockout opening of a recording tape cassette is a reusable record tab which comprises a body that blocks the opening and at least one resilient leg projecting from the body. The leg is bowed to press against an inner ramp of the cassette housing when the record tab is inserted into the opening, thus holding the record tab snugly in position. A small aperture through the external face of the body receives the point of a writing instrument for convenient removal of the record tab. FIGS. 1-4 show a reusable record tab for a VHS videotape cassette, and FIGS. 5-8 show a reusable record tab for a Betamax videotape cassette.

15 Claims, 8 Drawing Figures

REUSABLE RECORD TAB FOR VIDEOTAPE CASSETTE

FIELD OF THE INVENTION

The invention concerns a reusable record tab for a cassette such as a videotape cassette.

BACKGROUND ART

It is believed that all unrecorded videotape cassettes now on the market (including both "VHS" and "Betamax") have a breakout record tab which permits one to record on the tape until the tab is broken out. After the tab is broken out, a record-lockout finger on the recorder can enter the opening that the breakout tab had blocked. Such movement of the finger disables the record mechanism. When one later wishes to erase or make a new recording, the usual procedure is to cover the record-lockout opening with a piece of tape to prevent the record-lockout finger from entering the opening and disabling the record mechanism. If tape is not immediately available, the user might plug the opening with an object that could damage either the recorder or the tape. A piece of tape not only is unsightly, but its application and subsequent removal might result in a sticky deposit which could attract dirt and might cause the videotape and record mechanism to become contaminated.

Because of such problems, a variety of suggestions have been offered that would eliminate the need for tape to close an open record-lockout opening. Most, if not all, such suggestions concern record tabs which either are removably inserted into a record-lockout opening or are permanently positioned within such an opening and can be moved either to block or unblock the opening. In U.S. Pat. No. 4,012,011 (Saito), a number of such tabs or lugs are described, "and the information which is obtained by detecting the presence or absence or the disposition of the lug can be utilized for the purpose of preventing an inadvertent erasure as well as distinguishing between a stereophonic and an educational tape, switching of a tape speed, a selection of Dolby circuit and switching of a bias voltage, or any combination thereof" (col. 12, lines 13–20). Even though the Saito patent specifically concerns audiotape cassettes, its suggestions would be equally applicable to videotape cassetes.

Among suggestions in the Saito patent are "a lug aperture 78 in which a lug 79 is rockably mounted" as shown in FIG. 22; a cylindrical lug 99 having a hiatus 99*d* which, as shown in FIGS. 27 and 28 can be rotated to block or unblock a rectangular aperture; a cylindrical lug 104, an end of which has a blocking wall 104*b*, the position of which closes or opens the aperture 103 in FIG. 34; a lug 112 which is slidable to leave either one-half of an aperture 111 open as shown in FIG. 42; and a solid lug 114 shown in FIG. 44 which can be replaced by the tubular lug 115 shown in FIG. 45. Although the Saito patent does not explain the function of the tubular lug 115, its absence would permit a record-lockout finger to enter the aperture 113 into which those lugs interchangably fit.

While many of the Saito suggestions require a special opening, it would be desirable to employ a record tab that could be used in a cassette such as a VHS or Betamax cassette, either to close the opening left after breaking out a record-lockout tab or to close such an opening in a cassette which is identical except being molded without a record-lockout tab.

DISCLOSURE OF INVENTION

The invention provides for a recording tape cassette a reusable record tab that is easy to insert or remove and yet reliably remains securely in place. After the record-lockout tab of a conventional VHS or Betamax videotape cassette has been broken away, the record tab of the invention can be inserted into the record-lockout opening to permit recording and later easily removed to allow rerecording. No special tooling is necessary to permit either of those videotape cassettes to employ the novel reusable record tabs instead of the customary breakout tabs.

Briefly, the invention concerns a cassette which has a housing including an external wall which is formed to define a record-lockout opening. The housing also is formed to have an inner ramp at the opening. Removably fitting into the opening is a reusable record tab which comprises a body which is substantially coextensive with said opening, and at least one resilient leg projecting from said body,
the leg being bowed to press against said inner ramp when the record tab is inserted into the opening, thus holding the record tab snugly in position,
the body being formed to define an aperture through its external face approximating the size of the point of a writing instrument which can be inserted for convenient removal of the record tab.

In a conventional VHS videotape cassette, the inner ramp is the inner face of said external wall of the housing, and the housing is formed with a wall beneath the record-lockout opening and extending parallel to said ramp. When a reusable record tab of the invention is inserted into the opening, the external face of its body lies essentially in the plane of the outer face of said external wall, and the opposite face of its body rests against the outer face of the wall beneath the opening.

At the record-lockout opening of a conventional Betamax videotape cassette, the inner ramp extends orthogonally to the outer face of said external wall of the housing, and a second inner ramp is parallel to the first ramp. A reusable record tab of the invention is formed with two outwardly bowed legs which are pinched between the two ramps when the record tab is inserted into the opening. Preferably those legs are tapered inwardly toward and joined at their extremities to enhance insertion of the record tab into the record-lockout opening.

Each of the housing and the reusable record tab is preferably molded plastic such as acetal resin which is tough and resistant to deformation. Preferably the color of the plastic of the record tab contrasts to that of the housing. The external face may be embossed with the logo of the manufacturer or distributor.

THE DRAWING

In the drawing, all figures of which are schematic:

Figure 1:
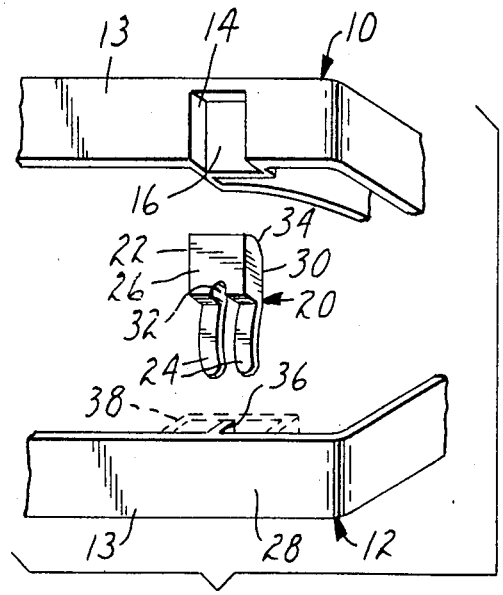
FIG. 1 is a fish-eye view in perspective of a fragment of the rear of a VHS videotape cassette at which a reusable record tab of the invention is located.
Figure 2:
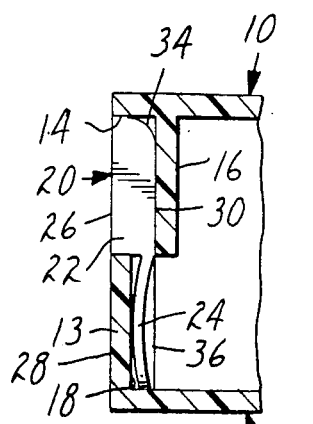
FIG. 2 is a section through the cassette of FIG. 1 at its record tab.
Figure 3:
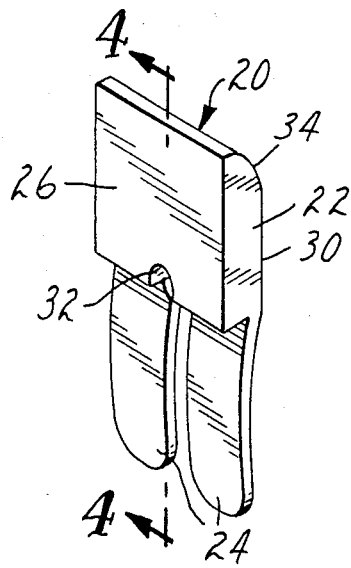
FIG. 3 is a perspective view of the record tab of FIGS. 1 and 2.
Figure 4:
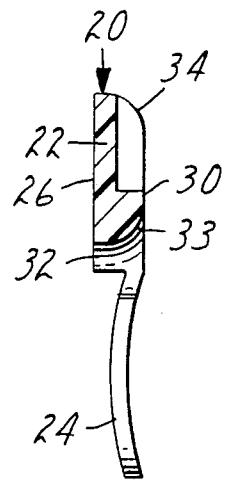
FIG. 4 is a section along line 4—4 of FIG. 3.

Referring first to FIGS. 1-4, a conventional VHS cassette has a housing including a base 10 and a cover 12 which when assembled have an external wall 13. The base portion of the external wall 13 is formed to define a record-lockout opening 14 from which either a lockout recorded tab has been broken away, or the base 10 has been molded without such a tab. Beneath the opening 14 in the base 10 is a wall 16 extending parallel to the inner face 18 of the external wall 13. Removably fitting into the opening 14 is a reusable record tab 20 comprising a body 22 and a pair of resilient legs 24 projecting from the body. Each leg is bowed, and its convex surface presses against the inner face 18 of the external wall 13 of the cover 12. The inner face 18 acts as a ramp when the record tab 20 is inserted into the opening. This holds the record tab 20 snugly in position, thus preventing the record-lockout finger of a VHS recorder from entering the opening 14. When the record tab 20 is positioned in the opening 14, the external face 26 of its body 22 lies substantially in the plane of the outer face 28 of the external wall 13, and the opposite face 30 of the body rests against the outer face of the wall 16.

The body 22 is formed to define an aperture 32 through its external face 26. The aperture 32 approximates the size of the point of a writing instrument which upon being inserted therein provides convenient removal of the record tab. The back wall 33 of the aperture 32 is sloped to permit the writing instrument to penetrate the aperture at an acute angle with respect to the outer face 28 of the external wall 13. This enables one to lift the body 22 to facilitate pushing the record tab out of the opening. For the same reason, the edge 34 of the body opposite to the legs 24 is rounded.

The record tab 20 has two legs, because the housing of some VHS cassettes currently being manufactured have a rib 36 (FIG. 1) that otherwise would prevent the record tab from being inserted into the record-lockout opening 14 of those cassettes. Instead of the rib 36, other VHS cassettes have a U-shaped wall 38 indicated by dotted lines in FIG. 1. For use in those cassettes, the record tab could have a single leg, but the double-leg version 20 is more versatile.

Figure 5:
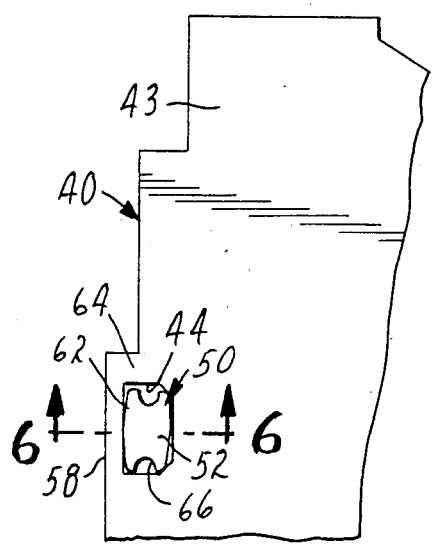
FIG. 5 is a bottom view of a fragment of a Betamax videotape cassette at which a reusable record tab of the invention is located.
Figure 6:
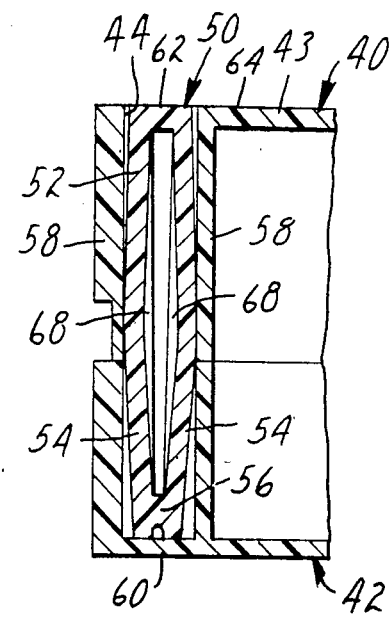
FIG. 6 is a section along line 6—6 of FIG. 5.
Figure 7:
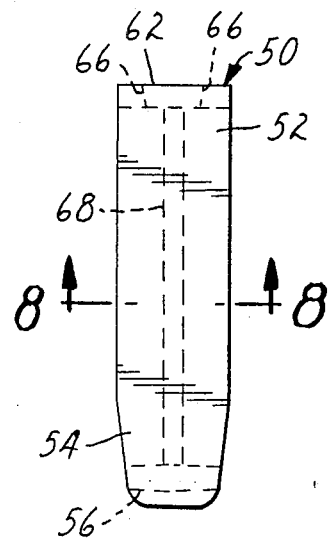
FIG. 7 is a plan view of the record tab of FIGS. 5 and 6.
Figure 8:
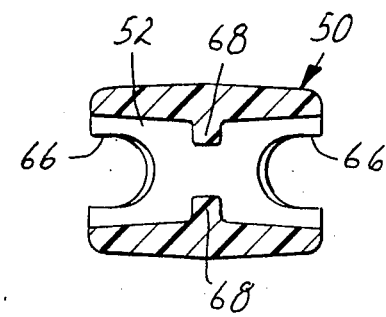
FIG. 8 is a section along line 8—8 of FIG. 7.

Referring now to FIGS. 5-8, a conventional Betamax cassette has a housing including a base 40 and a cover 42. The broad external wall 43 of the base is formed to define a record-lockout opening 44 from which either a breakout record tab has been broken away, or the base 40 has been molded without such a tab. Removably fitting into the opening 44 is a reusable record tab 50 comprising a body 52 and a pair of resilient, outwardly bowed legs 54 projecting from the body and joined to each other at their extremities 56. The legs are tapered inwardly toward their extremities to enhance their insertion between a pair of parallel walls 58 which act as ramps on which the convex surfaces of the legs 54 ride. This pinches the legs, thus holding the record tab 50 snugly in position and preventing the record-lockout finger of a Betamax recorder from entering the opening 44. The overall length of the record tab 50 approximates the interior thickness of the Betamax cassette so that when the extremities 56 of its legs 54 contact the base 60 of the channel between the parallel walls, the external face 62 of its body 52 lies substantially in the plane of the outer face 64 of the external wall 43.

An aperture 66 through the external face 62 of the body 52 approximates the size of the point of a writing instrument which can be inserted to remove the record tab. Centrally of the concave face of each leg 54 is a rib 68. Upon molding an early prototype of the record tab 50, shrinkage of the plastic produced an excessive bowing of the legs, and the ribs 68 desirably restrict the bowing.

Preferred prototypes of the record tabs 20 and 50 which have been successfully tested had dimensions as follows:

|  | Record tab 20 | Record tab 50 |
| --- | --- | --- |
| Overall length | 2.1 cm | 2.3 cm |
| Maximum width | 1.0 cm | 0.6 cm |
| Thickness of body | 3.0 mm | 3.6 mm |
| Thickness of legs | 0.8 mm | 1.0 mm |
| Radius of aperture | 1.0 mm | 1.0 mm |

Although the reusable record tab of the invention is specifically intended to be used to block or unblock a record-lockout opening of a cassette, it could be used for other purposes such as those described in the above quotation from the Saito patent.

What is claimed is:

1. A recording tape cassette including a housing comprising walls including an external wall having an outer surface, a record-lockout opening, and an inner ramp surface extending away from the opening, and a recessed wall defining the depth of said record-lockout opening from said external wall and extending parallel to said ramp surface, said cassette including a reusable record tab which removably essentially fills the opening, which record tab comprises:

a body which is substantially coextensive with said opening in the plane of said external wall, said body having an outer surface lying substantially in the plane of the outer surface of said external wall, and having a surface opposite said outer surface resting against said recessed wall when the body of the record tab is in the opening, and at least one resilient leg projecting from said body, the leg being bowed to press against said inner ramp surface when the body of the record tab is positioned in the opening to hold the record tab snugly in position, the body having an aperture through its external face approximating the size of the point of a writing instrument which can be inserted for convenient removal of the record tab.

2. A cassette according to claim 1 wherein said aperture extends through the outer surface of the body at the edge of the body closest to said ramp surface when the body of the tab is in the opening.

3. A cassette according to claim 1 wherein said record tab has two legs, each bowed so that its convex surface presses against said inner ramp surface when the body of the record tab is in the opening.

4. A cassette according to claim 1 wherein both said walls and said record tab are molded of plastic and the color of the plastic of the record tab contrasts to that of the walls.

5. A recording tape cassette including a housing comprising walls including an external wall having an outer surface and a record-lockout opening, with one of said walls having an inner ramp surface extending away from the opening, said cassette including a reusable record tab which removably essentially fills the opening, which record tab comprises:

a body which is substantially coextensive with said opening in the plane of said external wall, and at least one resilient leg projecting from said body, the leg being bowed to press against said inner ramp surface when the body of the record tab is positioned in the opening to hold the record tab snugly in position, the body having walls defining an aperture through the outer surface of the body at the edge of the body closest to said ramp surface when the body of the tab is in the opening, said aperture being approximating the size of the point of a writing instrument which can be inserted for convenient removal of the record tab, said walls defining said aperture being sloped to permit the writing instrument to penetrate the aperture at an acute angle with respect to the outer surface of said external wall, and said body having a rounded edge opposite the leg to facilitate pushing the body of the record tab out of the opening.

6. A recording tape cassette including a housing comprising walls including an external wall having a record-locking opening, and an inner ramp surface extending substantially orthogonally to the outer surface of said external wall away from the opening, said walls defining a second ramp surface extending substantially parallel to the first ramp surface in spaced opposed relationship, said cassette including a reusable record tab which removably essentially fills the opening, which record tab comprises:

a body which is substantially coextensive with said opening in the plane of said external wall, and two resilient outwardly bowed legs projecting from said body, which legs are pinched between the two ramp surfaces when the body of the record tab is inserted in the opening to hold the record tab snugly in position, the body having an aperture through its external face approximating the size of the point of a writing instrument which can be inserted for convenient removal of the record tab.

7. A cassette according to claim 6 wherein the two legs of the record tab are joined at their extremities and are tapered inwardly toward their extremities.

8. A cassette according to claim 6 wherein said aperture extends through the outer surface of said external wall at an edge of said body.

9. A reusable record tab for use in a recording tape cassette including a housing comprising walls inclusing an external wall having an outer surface, a record-lockout opening, and an inner ramp surface extending away from the opening, and a recessed wall defining the depth of said record-locked opening from said external wall and extending parallel to said ramp surface, said reusable record tab being adapted to removably essentially fill the opening, and comprising:

a body which is adapted to be substantially coextensive with said opening in the plane of said external wall having an outer surface lying substantially in the plane of the outer surface of said external wall, and having a surface opposite said outer surface resting against said recessed wall when the body of the record tab is in the opening, and at least one resilient leg projecting from said body, the leg being bowed to press against said inner ramp surface when the body of the record tab is positioned in the opening to hold the record tab snugly in position, the body having an aperture through its external face approximating the size of the point of a writing instrument which can be inserted for convenient removal of the record tab.

10. A record tab according to claim 9 wherein said aperture extends through the outer surface of the body at the edge of the body closest to said ramp surface when the body of the tab is in the opening.

11. A record tab according to claim 9 wherein said record tab has two legs, each bowed so that its convex surface presses against said inner ramp surface when the body of the record tab is in the opening.

12. A reusable record tab for use in a recording tape cassette including a housing comprising walls including an external wall having a record-lockout opening, with one of said walls having an inner ramp surface extending away from the opening, said reusable record tab being adapted to removably essentially fill the opening, and comprising:

a body which is adapted to be substantially coextensive with said opening in the plane of said external wall, and at least one resilient leg projecting from said body, the leg being bowed to press against said inner ramp surface when the body of the record tab is positioned in the opening to hold the record tab snugly in position, the body having walls defining an aperture through the outer surface of the body at the edge of the body closest to said ramp surface when the body of the tab is in the opening, said aperture being approximating the size of the point of a writing instrument which can be inserted for convenient removal of the record tab, said walls defining said aperture being sloped to permit the writing instrument to penetrate the aperture the aperture at an acute angle with respect to the outer surface of said external wall, and said body having a rounded edge opposite the leg to facilitate pushing the body of the record tab out of the opening.

13. A reusable record tab for use in a recording tape cassette including a housing comprising walls including an external wall having a record-lockout opening, and an inner ramp surface extending substantially orthogonally to the outer surface of said external wall away from the opening, said walls defining a second ramp surface extending substantially parallel to the first ramp surface in spaced opposed relationship, said reusable record tab being adapted to removably essentially fill the opening and comprising two outwardly bowed legs projecting from said body, which legs are pinched between the two ramp surfaces when the body of the record tab is inserted in the opening to hold the record tab snugly in position, the body having an aperture through its external face approximating the size of the point of a writing instrument which can be inserted for convenient removal of the record tab.

14. A record tab according to claim 13 wherein the two legs of the record tab are joined at their extremities and are tapered inwardly toward their extremities.

15. A record tab according to claim 13 wherein said aperture extends through the outer surface of said external wall at an edge of said body.

* * * * *